United States Patent [19]

Hunter

[11] Patent Number: 5,589,240
[45] Date of Patent: Dec. 31, 1996

[54] MULTIPLE CELLULAR CONFINEMENT ASSEMBLY FOR PLANT PROPAGATION

[75] Inventor: Ronald A. Hunter, Finksburg, Md.

[73] Assignee: Atlantic Construction Fabrics, Inc., Richmond, Va.

[21] Appl. No.: 412,780

[22] Filed: Mar. 28, 1995

[51] Int. Cl.⁶ .............................. B29D 22/00; A01G 9/02
[52] U.S. Cl. .................... 428/34.1; 428/156; 428/172; 428/116; 428/178; 47/65; 47/77; 47/85
[58] Field of Search ................................... 428/188, 178, 428/34.1, 116, 172; 47/85, 39, 65, 77, 86

[56] References Cited

U.S. PATENT DOCUMENTS

| | | | |
|---|---|---|---|
| Re. 32,808 | 12/1988 | Van Wingerden | 47/85 |
| 4,041,641 | 8/1977 | Dietz | 47/17 |
| 4,213,274 | 7/1980 | Skaife | 47/81 |
| 4,395,846 | 8/1983 | Gjertz | 47/86 |
| 4,453,344 | 6/1984 | Wingerden | 47/85 |
| 4,578,899 | 5/1986 | Katila | 47/86 |
| 5,213,857 | 5/1993 | Erkkila | 47/85 |
| 5,292,571 | 3/1994 | Quinn | 428/184 |

*Primary Examiner*—Donald Loney
*Attorney, Agent, or Firm*—David H. Semmes

[57] ABSTRACT

The assemblage consists of an in-ground assembly container 100 for plant propagation, formed of plastic strips 112 joined together to form, when compressed, a honeycomb configuration of container cells 110. Each cell is used to grow individual types of trees or plants. Walls of the cells are respectively embossed to enhance containment of potting soil. By combining the honeycomb container cells 110 with a pervious mat 120 and an impervious supporting liner 130, applied nutrients and water will not escape into the ground soil except by controlled pipe drainage 140. This combination will thus allow for total water and nutrient recirculation back through the system. The outlay includes a PVC liner 130, an optional drainage layer 120 and weed control fabric 122.

5 Claims, 2 Drawing Sheets

MULTIPLE CELLULAR CONFINEMENT ASSEMBLY FOR PLANT PROPAGATION

BACKGROUND OF THE INVENTION

The importance of having cellular plant growing constructions which are specifically adapted to the subsoil is among the objects of this invention. The present invention thus provides a botanical kit having a plurality of multiple soil mix compartments, wherein the kit may be retained within a cavity in-ground, the same being supported by a permeable drain board and an impermeable liner, the liner being supported and partially encased by the subsoil in-ground. An appropriate drain for recycling water and nutrients from a multiple cellular layer and its combination is provided herein.

PRIOR ART

| INVENTOR | DATE | PAT. NO. | DESCRIPTION |
| --- | --- | --- | --- |
| Dietz | Aug., 1977 | 4,041,641 | Growing Plants within an Enclosure |
| Skaife | July 1980 | 4,213,274 | Organic Growing Medium |
| Gjertz et al. | Aug., 1983 | 4,395,846 | Cellular Compartments Boxes |
| Van Wingerden | June 1984 | 4,453,344 | Seedling Propagating Container |
| Katila et al. | April 1986 | 4,578,899 | Set of Growing Cells for Growing Plants |
| Wingerden | Dec., 1988 | Re. 32,808 | Plant Propagating Container and Method |
| Erkkilä | May 1993 | 5,213,857 | Cell-Structure Plant Growing Container |

SUMMARY OF INVENTION

The CELLUGRO™ System

The assemblage consists of an in-ground assembly container for plant propagation, formed of plastic strips joined together to form, when compressed, a honeycomb configuration of container cells. Each cell is used to grow individual types of trees or plants. Walls of the cells are respectively embossed to enhance containment of potting soil. By combining the honeycomb container cells with a pervious mat and an impervious supporting liner, applied nutrients and water will not escape into the ground soil except by controlled pipe drainage. This combination will thus allow for total water and nutrient recirculation back through the system. The outlay includes a PVC liner, an optional drainage layer and weed control fabric.

The objectives of invention include the following: to enhance the growth of more product in a greatly reduced area, wherein one requires: minimum labor to install; minimum labor to plant; minimum labor to maintain; minimum labor to grow. Likewise, there are fewer watering times required; water may be recycled; there is no wasted water; one eliminates water runoff that could contaminate a neighboring water source and a larger product is grown quicker. Moreover, these objectives are reached: stronger root systems obtain within the assemblage; there develop no circling roots; a better looking product is propagated and the product is grown in a natural habitat viz in-ground. The product is not exposed to extreme temperature changes, nor is it exposed to wintering problems common to floral pots; and finally the product is easy to harvest.

DESCRIPTION OF PREFERRED EMBODIMENTS

Figure 1:
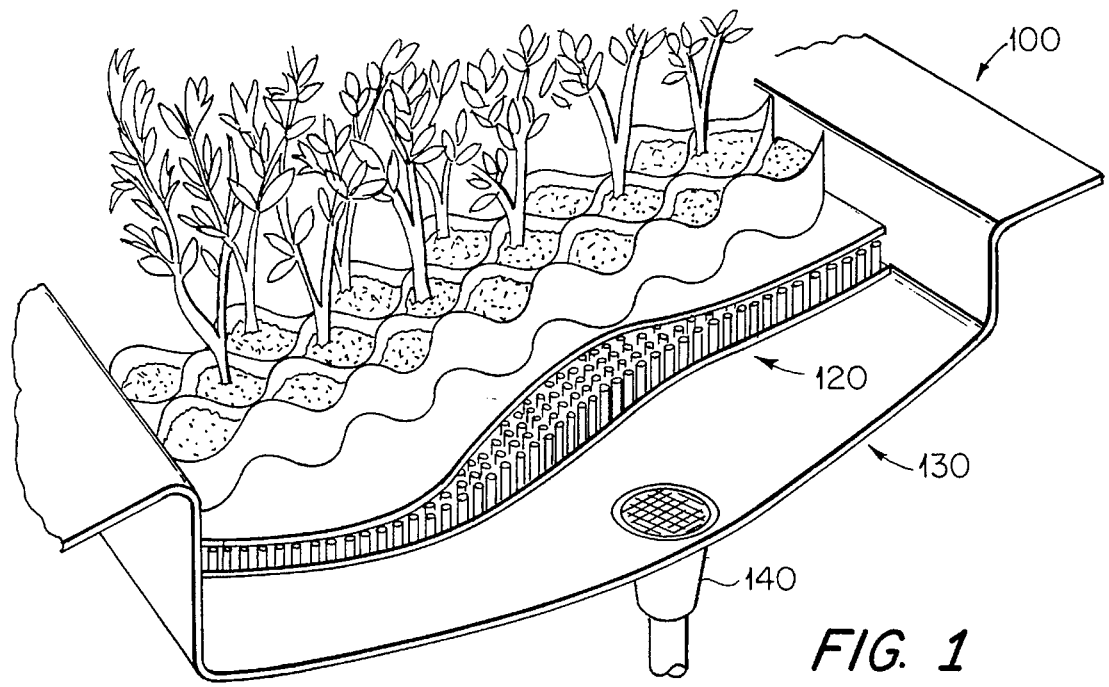
FIG. 1 is a perspective view of in partial section of CELLUGRO™ containment in accordance with the invention.

The present cellular confinement assembly for propagation of plants 100, includes four basic components, namely: honeycomb configured soil mix containers 110, defined as CELLUGRO SYSTEM™; a drainage board 120 beneath the containers 110, the board being known in the trade as an AMERDRAIN™ type 650, a replacement for aggregate drains; a PVC liner 130 upon which the components 110, 120 are supported; a drain 140, set within the liner 130 whereby water and fluid nutrients may be drained and recycled.

CELLUGRO, PRESTO GEOWEB, GEOSYSTEMS and AMERDRAIN are proprietary trademarks.

Figure 2:
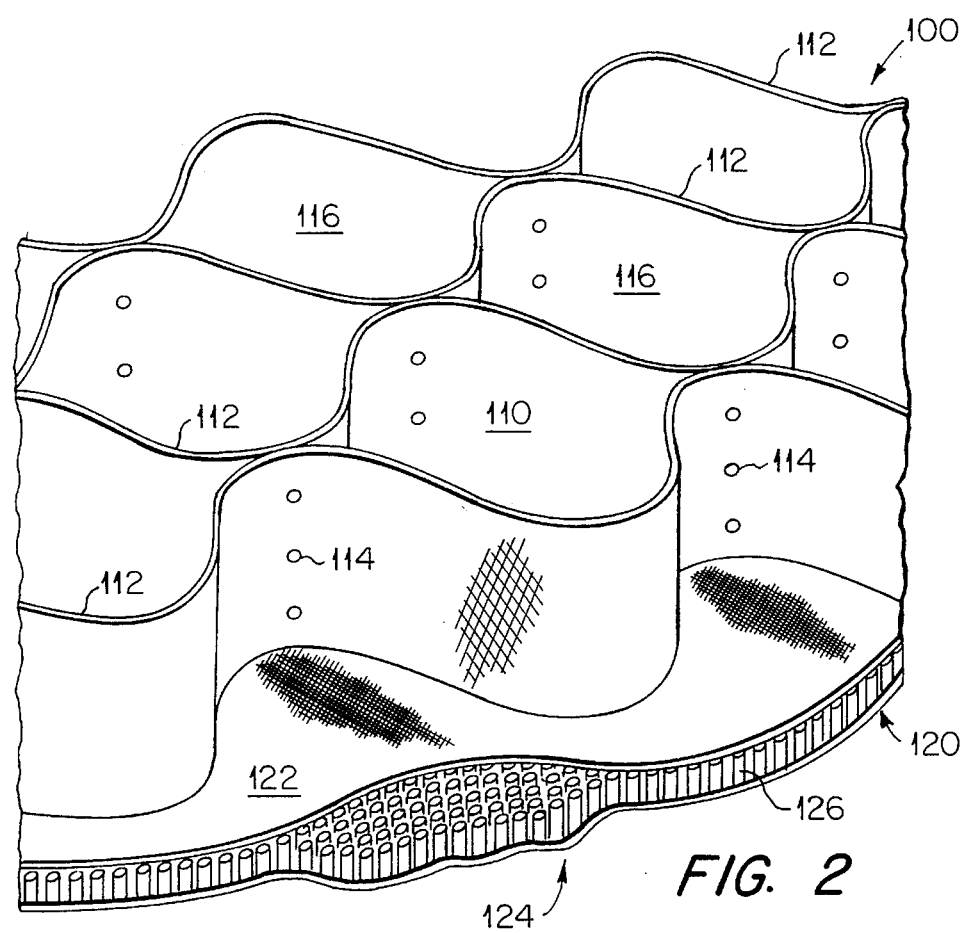
FIG. 2 is an enlarged perspective of combination for cellular confinement system and associated drain board of FIG. 1, less a recycling inground drain.
Figure 3:
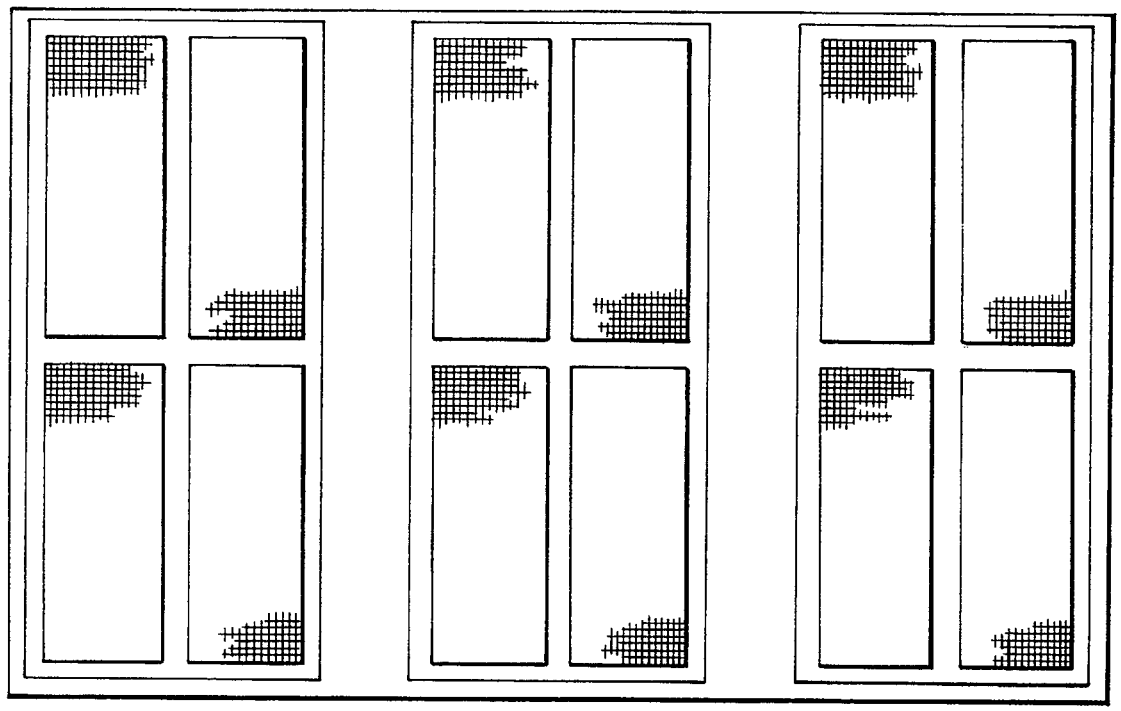
FIG. 3 is a top plan schematic illustrating nursery plats, each plat having multiple segments of the invention composite, reference FIGS. 1 and 2, above.
Figure 4:
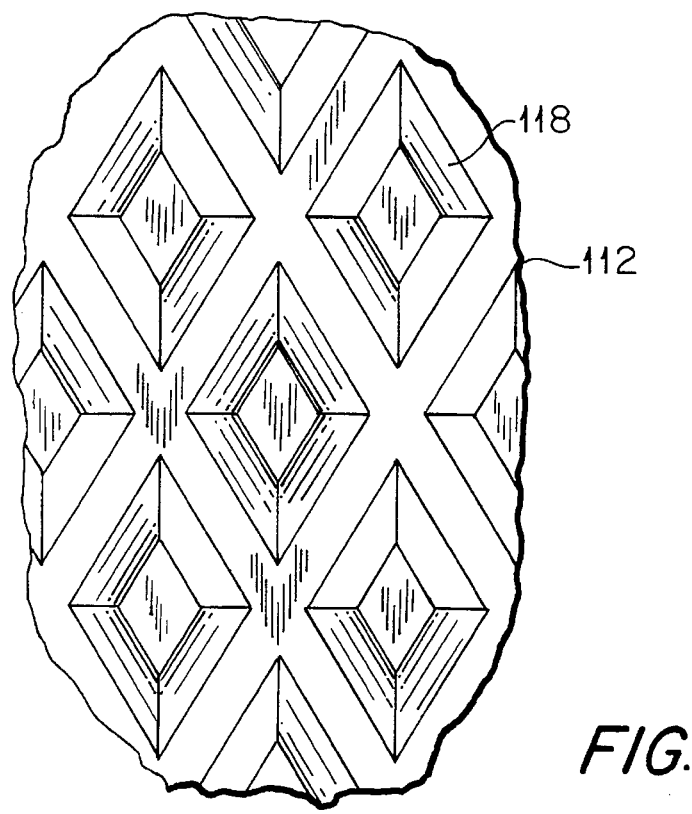
FIG. 4 is an enlarged perspective of a segment of the exterior of walls 112, illustrating diamondback protrusions thereon.

Referring to FIGS. 1 and 2, the confinement of planting soil and generative nutrients is effected by a cellular confinement structure 110, known in the trade as GEOWEB™ but whose adaptation herein is defined as CELLUGRO™. Opposed cellular soil container walls 112 are formed of semi-rigid polyethylene sheets, such that upon compression transversely, they define open-ended looplike cells 116 with sustaining weldments 114 binding the cells together. The unit is adapted to deposit in-ground, providing a natural habitat for plant growth as individual cells may be filled with an infill of soil mix and plant. Protrusions 118 and indentations 118' are applied to the webs, such that the textured finish has diamondback surface cladding molded as protrusions into at least one surface of respective cell walls. A negative finish of indentations 118' on the opposed face of each wall 112 is embossed. Its negative pattern and location are the same as the positive diamondback pattern. This unique diamondback pattern significantly increases the frictional interlock between the surface of the cell and infill material, enhancing performance for propagation herein. These opposed sheets forming cell walls 112 may be collapsed into compact lightweight flat bundles for easy shipment, before and after construction into the containers 100.

Drain board 120 is actually a soil drainage unit, known in the trade as AMERDRAIN™, a replacement for aggregate drains of a Type 650. It consists of a flexible, fluid-permeable, weed-control fabric 122 which is welded to a substrate of spaced-apart pylon base 124, the combination also being known in the trade as a soil drainage mat. Its function is to support the infill of the soil mix together with CELLUGRO™ structure containers 110 while simultaneously permitting a normal runoff of applied water and fluid nutrients, leaving the infill intact. Whereas the screen 122 is readily deformable between supporting pylons 126 of mat 124, the mat, per se is not, whereby the mat retains its original configuration, supportive of the load of the honeycomb structure containers 110 above and the subsoil supported liner 130. While not shown, the mat 124 is fluid permeable, permitting the flow of excess fluids onto liner 130.

PVC liner 130 is in sheet form, the same being sized to fit a proposed substrate cavity. This liner confines the container system on at least three sides thereof. Thus, as shown, in FIG. 1, the assemblage 100 rests within a subsoil cavity, the top of each structure container 110 being at ground level and the bottom and sides of liner 130 resting on the bottom of a prepared subsoil cavity. Set within liner 130 is the drain 140 to recycle fluid runoff.

Whereas the present cellular confinement assemblage for plant propagation has been defined with reference to specifically configured elements, the scope of invention is determined with reference to the ensuing claims.

I claim:

1. A compressible cellular container assembly (100) for plant propagation which is confineable in subsoil of the ground, comprising:

a) collapsible linked two-layer, open ended structure containers (110) formed of opposed container walls (112), said containers being of volute horizontal cross-section and bonded by weldment (114) at opposed contacting wall portions to form multiple cells (116), for retention of a soil mix and an associated plant;

b) a permeable soil drain board (120), upon which the soil mix structure containers (110) are supported, said drain board defining a fluid permeable mat (124) having pylons (126); said mat resting upon a foraminous screen (122);

c) an impermeable ground liner (130) resting within a cavity of subsoil of the ground, said liner being interposed between ground and drainage board (120) to confine the container (110) and drainage board (120) on at least three sides thereof;

d) a drainage means (140) for the liner to drain recyclable water and fertilizer from the drainage means.

2. The cellular containment assembly for plant propagation of claim 1 wherein walls (112) of respective structure containers (110) are embossed, at least externally, with positive, three-dimensional protrusions (118) which form a textured finish.

3. The cellular containment assembly for plant propagation of claim 2 wherein protrusions (118) of walls of respective structure containers (110) are of diamondback configuration.

4. The cellular containment assembly for plant propagation of claim 3 wherein protrusions and indentations (118)—(118') are embossed upon opposed faces of respective walls (112), the positive and negative patterns of which are the mirror image configuration of each other.

5. The cellular container assembly for plant propagation of claim 4 wherein multiple plant container structures (110) are disposed sidewise and end-to-end, in-ground, each of said structures (110), said drainage mat (120), said ground liner (130) and associated drainage means (140) being retained by nursery plats having plural segments.

\* \* \* \* \*